(12) United States Patent
Danna et al.

(10) Patent No.: US 11,963,915 B2
(45) Date of Patent: Apr. 23, 2024

(54) MOTORIZED PERSONAL TRANSPORTER

(71) Applicant: ITALDESIGN-GIUGIARO S.P.A., Turin (IT)

(72) Inventors: Fabio Danna, Monastero di Vasco (IT); Massimiliano Chidichimo, Nichelino (IT); Roberto Bodrone, Castiglione Torinese (IT); Antonio Matullo, Rivalta di Torino (IT)

(73) Assignee: ITALDESIGN-GIUGIARO S.P.A., Turin (IT)

( * ) Notice: Subject to any disclaimer, the term of this patent is extended or adjusted under 35 U.S.C. 154(b) by 292 days.

(21) Appl. No.: 17/631,288

(22) PCT Filed: Jul. 8, 2020

(86) PCT No.: PCT/IB2020/056402
§ 371 (c)(1),
(2) Date: Jan. 28, 2022

(87) PCT Pub. No.: WO2021/019330
PCT Pub. Date: Feb. 4, 2021

(65) Prior Publication Data
US 2022/0257440 A1 Aug. 18, 2022

(30) Foreign Application Priority Data
Aug. 1, 2019 (IT) .................. 102019000013641

(51) Int. Cl.
*A61G 5/04* (2013.01)
*A61G 5/08* (2006.01)
(Continued)

(52) U.S. Cl.
CPC ............... *A61G 5/04* (2013.01); *A61G 5/042* (2013.01); *A61G 5/08* (2013.01); *A61G 5/1051* (2016.11); *A61G 2203/10* (2013.01); *B62J 1/005* (2013.01)

(58) Field of Classification Search
CPC .......... A61G 5/04; A61G 5/042; A61G 5/041; A61G 5/046; A61G 5/045; A61G 5/043;
(Continued)

(56) References Cited

U.S. PATENT DOCUMENTS 4,861,058 A * 8/1989 Cresswell ............ A61G 5/0891
280/278
6,652,025 B2 * 11/2003 Sylvester ................. B62J 1/005
297/312

(Continued)

FOREIGN PATENT DOCUMENTS

CN 106333803 B * 8/2017
CN 105667695 B 11/2018
(Continued)

OTHER PUBLICATIONS

International Search Report, issued in PCT/IB2020/056402, dated Oct. 21, 2020, Rijswijk, NL.

*Primary Examiner* — Emma K Frick
(74) *Attorney, Agent, or Firm* — ArentFox Schiff LLP; Michael Fainberg

(57) ABSTRACT

A personal transporter includes a seat, a frame having a base and a strut supporting the seat, hinged to the base and pivotable between an open configuration and a folded configuration, a pair of driving wheels and at least one non-driving wheel associated to the base defining, in use, three unaligned points on the ground, a pair of electric motors, a
(Continued)

pair of control pedals, each associated to a respective electric motor to drive a respective driving wheel, and a support rod for supporting the strut in the open configuration, hinged to the strut and slidably mounted on the base in a guide. The base has a rear portion for supporting the at least one non-driving wheel and a pair of front portions, each hinged to the strut and integrally rotatable with a respective control pedal.

11 Claims, 7 Drawing Sheets

(51) Int. Cl.
*A61G 5/10* (2006.01)
*B62J 1/00* (2006.01)

(58) Field of Classification Search
CPC .......... A61G 5/047; A61G 5/048; A61G 5/08; A61G 5/1051; A61G 2203/10; B62J 1/00; B62J 1/005
See application file for complete search history.

(56) References Cited

U.S. PATENT DOCUMENTS

| | | | |
|---|---|---|---|
| 7,451,848 B2* | 11/2008 | Flowers | A61G 5/0891 |
| | | | 280/278 |
| 9,394,022 B2* | 7/2016 | Alink | B62J 1/10 |
| 9,896,148 B2* | 2/2018 | Baba | B62K 19/02 |
| 9,988,114 B1* | 6/2018 | Freakes | B62K 27/003 |
| 10,486,733 B2* | 11/2019 | Moujoud | B62K 5/007 |
| 10,858,057 B2* | 12/2020 | Newhouse | B62K 17/00 |
| 10,952,912 B2* | 3/2021 | Xu | A61G 5/125 |
| 11,433,966 B2* | 9/2022 | Monzidelis | B62K 9/02 |
| 11,504,286 B2* | 11/2022 | Cooper | F16H 7/06 |
| 11,642,258 B2* | 5/2023 | Moore | A61G 5/04 |
| | | | 180/6.5 |
| 11,827,300 B1* | 11/2023 | Staal | B62K 3/002 |
| 2003/0213626 A1 | 11/2003 | Hafendorfer | |
| 2017/0072989 A1* | 3/2017 | Moujoud | B62D 7/16 |
| 2017/0203811 A1* | 7/2017 | Germanovsky | A61G 5/125 |
| 2021/0371038 A1* | 12/2021 | Zeng | B62K 21/12 |

FOREIGN PATENT DOCUMENTS

| | | | | |
|---|---|---|---|---|
| GB | 2307453 A | * | 5/1997 | A61G 5/023 |
| GB | 2510334 A | * | 8/2014 | A61G 5/046 |

* cited by examiner

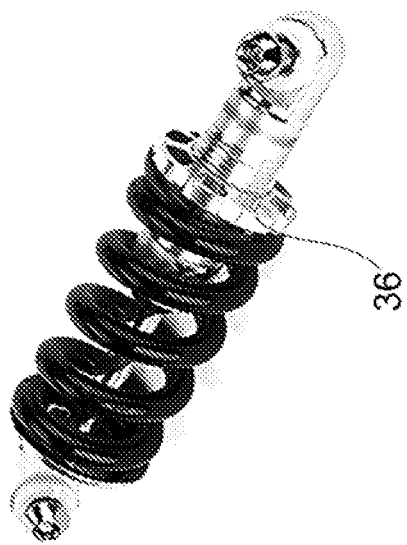
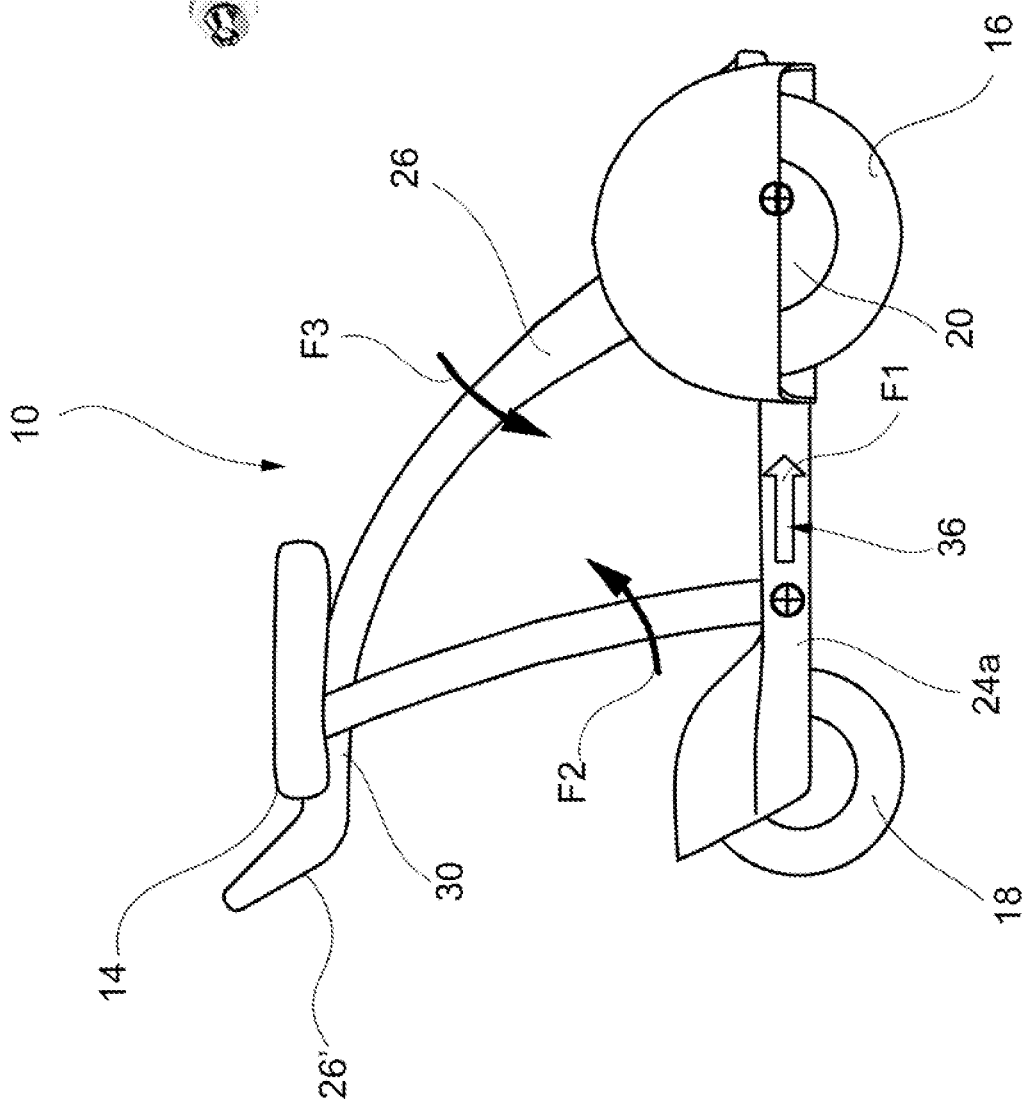
FIG.3b
FIG.3a

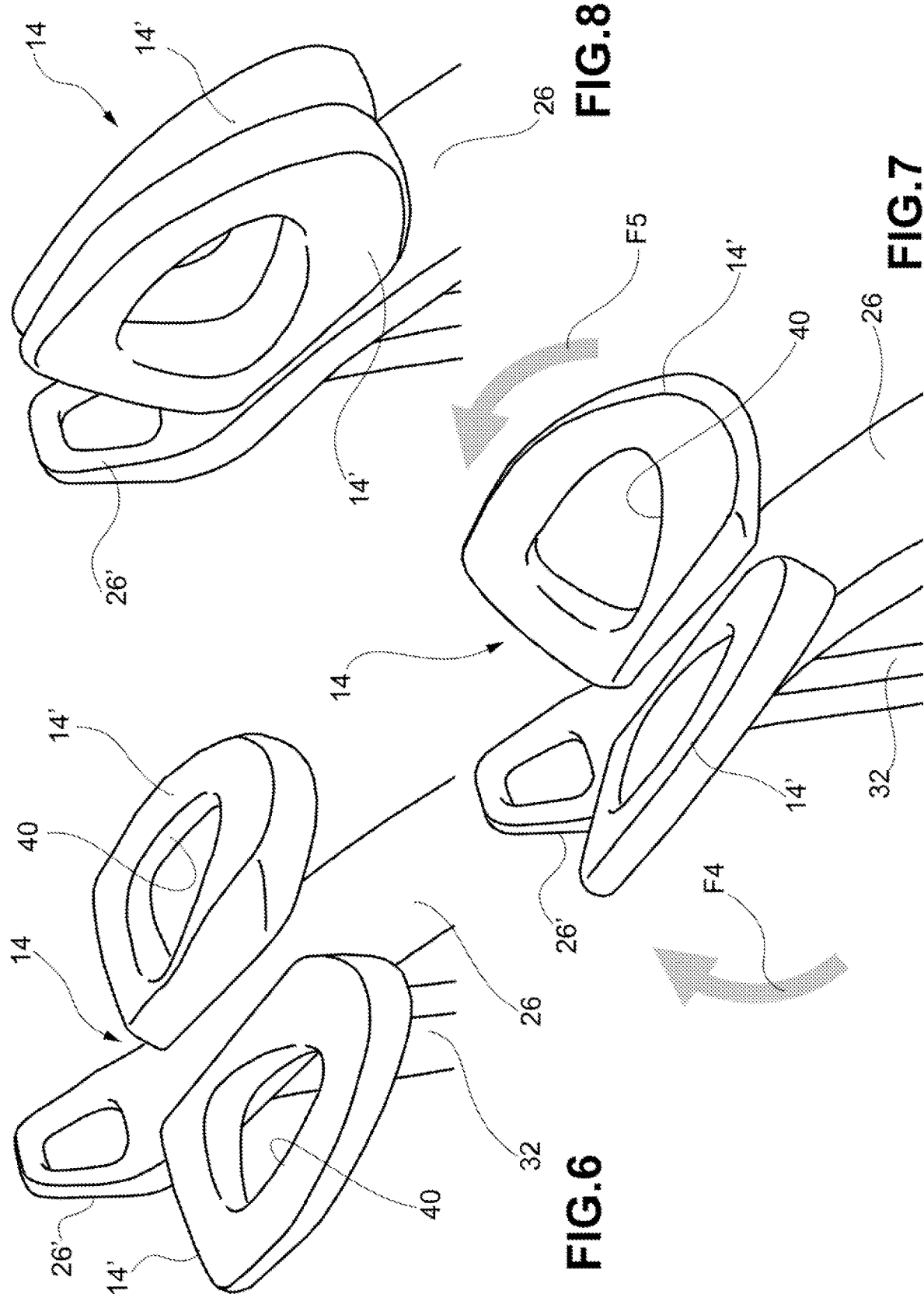

MOTORIZED PERSONAL TRANSPORTER

CROSS-REFERENCE TO RELATED APPLICATIONS

This application is a National Phase Application of PCT International Application No. PCT/IB2020/056402, having an International Filing Date of Jul. 8, 2020 which claims priority to Italian Application No. 102019000013641 filed Aug. 1, 2019, each of which is hereby incorporated by reference in its entirety.

Field of the Invention

The present invention generally relates to a motorized personal transporter, i.e. a light vehicle suitable for transporting a passenger.

Background of the Invention

A variety of personal transporters are known and commercially available, being a category of vehicles that includes electric skateboards, motorized scooters, self-balancing one-wheel or two-wheel vehicles (such as Segway) and others, which allow one to make short trips in urban contexts without having the disadvantages of cars (such as the need for parking, reduced accessibility in limited traffic zones, high cost, high environmental impact, etc.).

These known personal transporters, however, in order to be used safely by the passenger, require a fair amount of athletic skills and advanced balancing skills, and even, in some cases, an appropriate training period. This prevents their use by elderly people, or those with reduced motor ability, or, in general, people without particular athletic skills or without training.

SUMMARY OF THE INVENTION

The object of the present invention is to provide a personal transporter which does not suffer from the disadvantages of the prior art discussed above.

This and other objects are fully achieved according to the present invention by a personal transporter as described and claimed herein.

Advantageous embodiments of the present invention are also described.

In short, the invention is based on the idea of providing a transporter comprising:
- a seat arranged to accommodate a passenger in a sitting position;
- a frame comprising a base, arranged to form a support surface for the passenger's feet, and a strut which is connected to said base and which is arranged, in use, to support said seat in a lifted position relative to said base;
  wherein the strut is movable with respect to the base between an open configuration in which the seat is in a distal position relative to the base, and a folded configuration with respect to the base in which the seat is in a proximal position relative to the base;
  wherein the strut is hinged at a first end to the base pivotably between the open position and the folded position;
- a pair of driving wheels and at least one non-driving wheel joined to said base, said pair of driving wheels and said at least one non-driving wheel being configured to define, in use, three unaligned points of support on the ground;
- a pair of electric motors each suitable for supplying driving torque to a respective driving wheel;
- a pair of control pedals, each control pedal being associated to a respective electric motor to drive a respective driving wheel in rotation, as a function of a command imparted on this control pedal by the passenger sitting on the seat; and
- a support rod suitable, in use, to support the strut in the open position, said support rod being hinged to the strut near a second end of the strut, opposite to said first end of the strut, and being slidably mounted on the base;
  wherein the base has a guide, in which the support rod is slidably mounted;
  wherein said base comprises a rear portion arranged to support said at least one non-driving wheel and a pair of front portions, each hinged to the strut and pivotable integrally with a respective control pedal.

By virtue of the configuration of the personal transporter according to the invention described above, a passenger may drive the transporter without needing training and without having to balance on an unstable or difficult-to-maneuver vehicle and moreover may fold the frame of the vehicle to reduce its overall size, for example when loading the transporter into the trunk of a car.

Advantageously, the seat is also foldable so as to further reduce the overall size of the transporter.

BRIEF DESCRIPTION OF THE DRAWINGS

Further features and advantages of the present invention will become clearer from the detailed description that follows, given purely by way of non-limiting example with reference to the accompanying drawings, wherein:

FIG. 3a is a side view of the transporter of FIG. 1;

FIG. 3b is a perspective view of the detail of a component of the transporter of FIG. 1;

FIGS. 6, 7 and 8 are perspective views of a seat of the transporter of FIG. 1, according to an embodiment, wherein the seat is shown respectively in a first, a second, and a third configuration.

DETAILED DESCRIPTION

Figure 1:
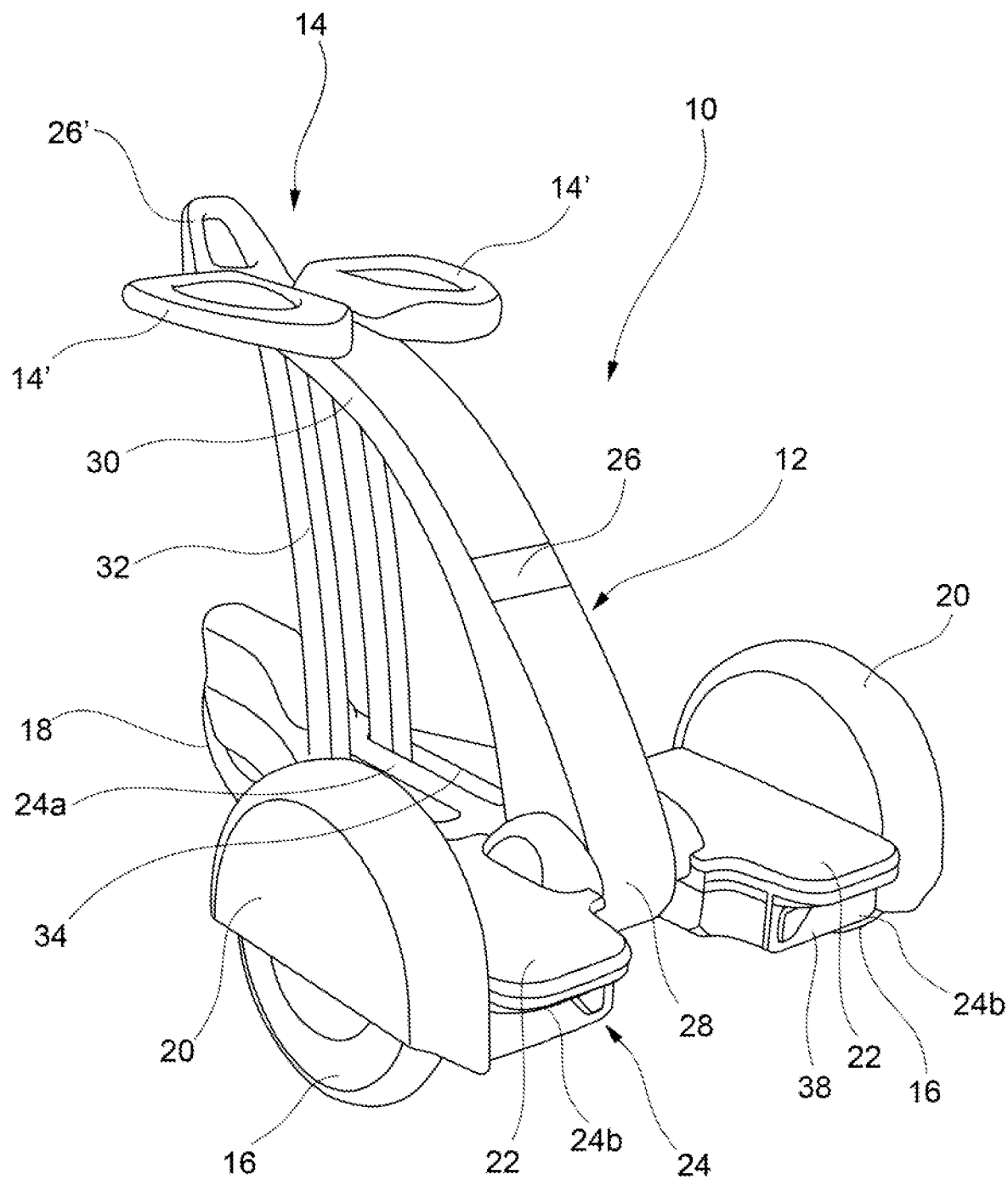
FIG. 1 is a perspective view of a transporter according to an embodiment of the invention, in a configuration of use.
Figure 2:
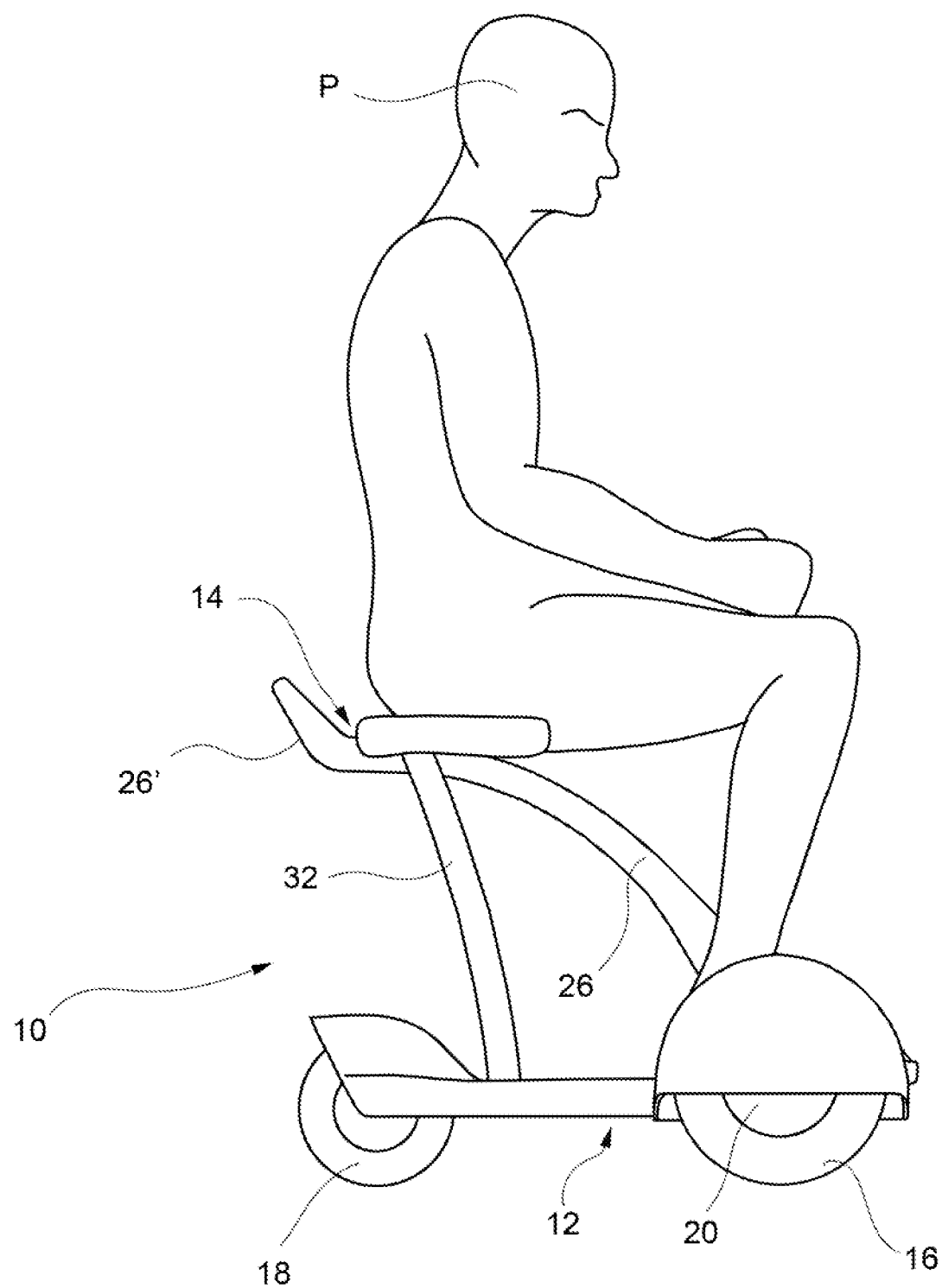
FIG. 2 is a side view of the transporter of FIG. 1, with a passenger seated.

With reference initially to FIGS. 1 and 2, a personal transporter 10 essentially comprises a frame 12, a seat 14 arranged to accommodate a passenger P in a sitting position, a pair of driving wheels 16 and at least one non-driving wheel 18, a pair of electric motors 20 and a pair of control pedals 22.

The frame 12 comprises a base 24, arranged to define a support surface for the feet of a passenger P, when the same is seated on the seat 14, and a strut 26.

As shown in FIGS. 1 to 9, the base 24 comprises a rear portion 24a, arranged to support the non-driving wheel 18, and a pair of front portions 24b, hinged to the strut 26 and pivotable, each integral with a respective control pedal 22. In the present description, expressions indicating orientations and positions, such as "front," "rear," "longitudinal" or "transverse," refer to the direction of travel of the transporter 10. Advantageously, the rear portion 24a of the base 24 defines a support surface useful, for example, for accommodating a bulky load or a piece of luggage to be transported. Preferably, this support surface is sized in accordance with the standard dimensions of a piece of luggage.

The strut 26 is connected to the base 24 at one of its first ends 28 and is suitable, in use, to support, near a second end 30 thereof, opposite the first end 28, the seat 14 in a lifted position relative to the base 24.

Figure 4:
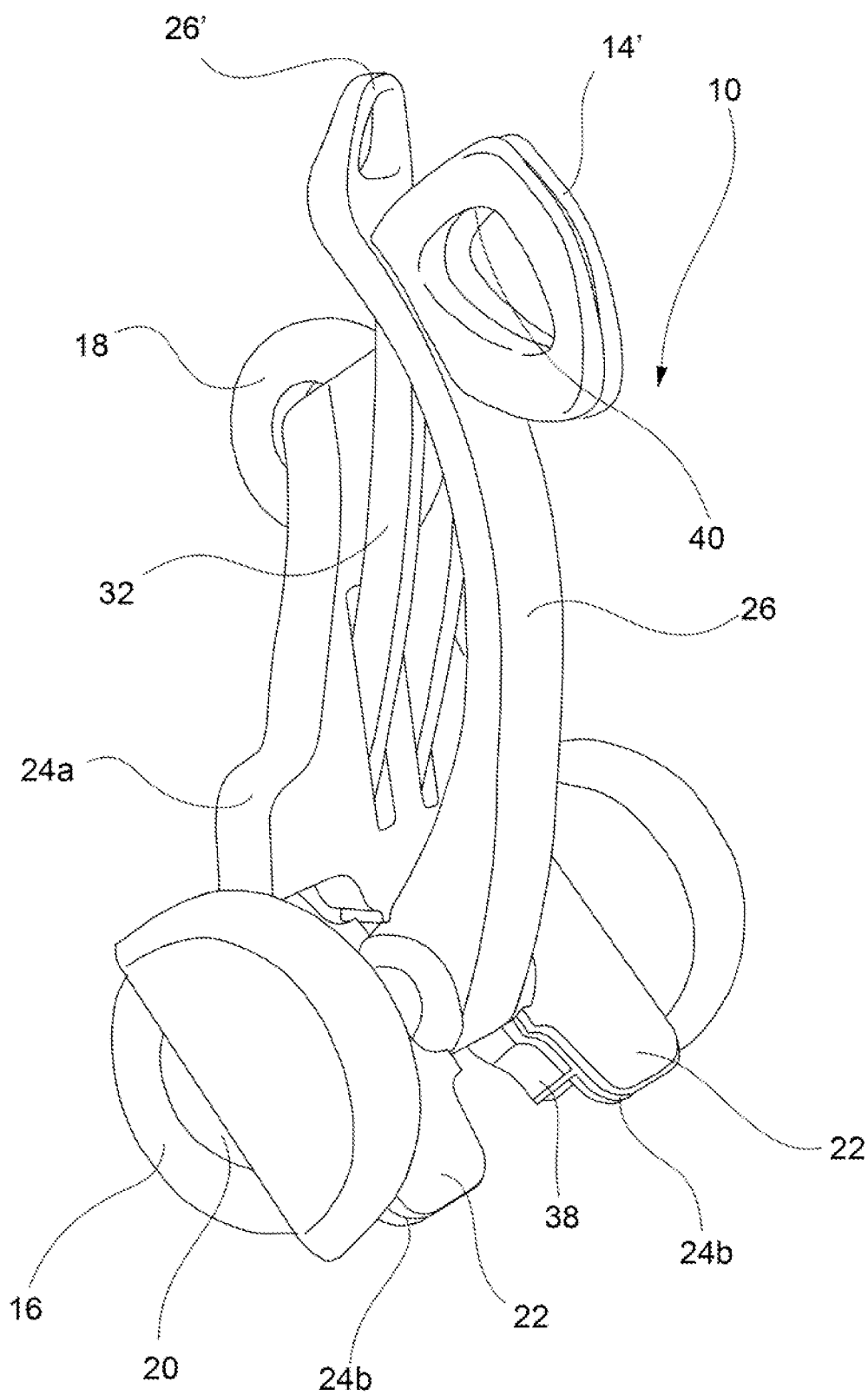
FIG. 4 is a perspective view of the transporter of FIG. 1, in a folded configuration.
Figure 5:
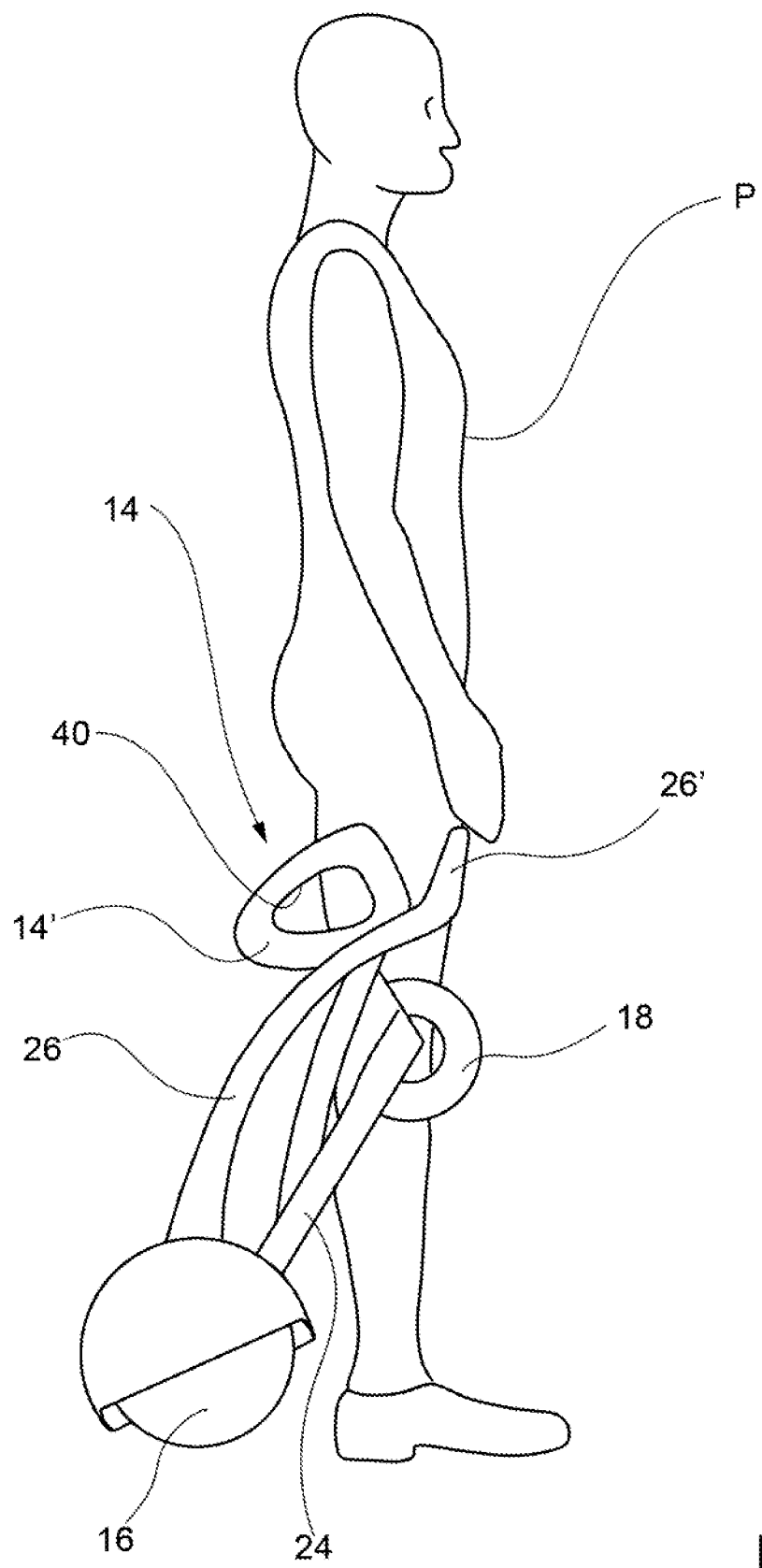
FIG. 5 is a side view of the transporter of FIG. 4, with a user.

The strut 26 is movable, with respect to the base 24, between an open configuration, shown in FIGS. 1 and 2, and a folded configuration, shown in FIGS. 4 and 5. In the open configuration, the strut 26 is arranged in such a way that the seat 14 is, relative to the base 24, in a distal position, i.e. in a position in which the seat 14, in conditions of use of the transporter 10, is arranged to accommodate a passenger P in a seated position. In the folded configuration, on the other hand, the strut 26 is arranged in such a way that the seat 14 is, relative to the base 24, in a proximal position, in which the seat 14 is not arranged to accommodate the passenger P in a sitting position. In such a configuration, the size of the transporter 10 is significantly reduced compared to the open configuration of the strut 26, so that the transporter 10 may for example be stored in the trunk of an automobile. When the strut 26 is in the folded configuration, the transporter 10 may be pulled, as shown in FIG. 5, by a standing passenger P, in a manner similar to that which occurs with a conventional trolley case. Furthermore, the strut 26 is hinged, at its first end 28, to the base 24, so as to be able to rotate between the aforesaid open configuration and the aforesaid folded configuration.

Preferably, at its second end 30, the strut 26 has a handle 26', arranged to allow the transporter 10 to be pulled when the strut 26 is in the folded configuration.

The transporter 10 further comprises a support rod 32. As may be seen from the figures, the support rod 32 may, for example, be made as a single element or be composed of two parallel fork-like profiles. The support rod 32 is configured to support the strut 26 in the open configuration in use, i.e. when the seat 14 is in the position arranged to accommodate a passenger P in a sitting position, and is mounted hinged to the strut 26, near the second end 30 of the strut 26 on one side, and slidingly on the base 24 inside a guide 34 defined in the base 24 on the other side. Preferably, the guide 34 is formed in the rear portion 24a of the base 24.

Preferably, between the guide 24 and the support rod 32 suitable damping means 36, e.g. spring or gas, are positioned, as shown in FIG. 3b. As shown in FIG. 3a, the damping means 36 are configured to dampen any stresses due to the weight of the passenger P seated on the seat 14 when encountering cracks, holes or bumps present on the ground on which the transporter 10 moves. In the example shown, when the transporter 10 passes over a crack in the ground, the support rod 32 slides within the guide 34 according to the direction indicated by the arrow F1 and, at the same time, rotates around the point where it is hinged on the strut 26, according to the direction of rotation indicated by the arrow F2. At the same time, the strut 26 rotates around the point where it is hinged to the base 24, according to the direction of rotation indicated by the arrow F3. Consequently, the seat 14 supported by the strut 26 is lowered, damping the effect of the stress and improving the comfort of the passenger P sitting on the seat 14.

The wheels of the transporter 10 are joined to the base 24, in particular a pair of driving wheels 16 and at least one non-driving wheel 18. The pair of driving wheels 16 and the non-driving wheel 18 are arranged so as to define, in use, three points of support of the transporter 10 on the ground unaligned with each other, i.e. three points that do not all lie on the same straight line. In particular, according to a preferable embodiment, the driving wheels 16 are arranged frontally and symmetrically relative to the transporter's 10 sagittal plane of symmetry, while a non-driving wheel 18 is arranged rearward along this plane. Clearly, the transporter 10 may comprise further wheels, and in particular at least one further non-driving wheel for creating four support points arranged in the conventional way for a four-wheeled vehicle.

Each driving wheel 16 is associated to a respective electric motor 20, which provides driving torque. In a preferable embodiment, the electric motors 20 are made as in-wheel electric motors, i.e. contained within the respective driving wheels 16, in a manner known per se.

The electric motors 20 are powered by an electric battery, preferably by a single electric battery 38, for example arranged in one of the front portions 24b, below one of the control pedals 22. Obviously, the number, type and position of the electric batteries 38 may be modified in a manner known per se.

In order to control the transporter 10, and thus to control each driving wheel 16, the transporter 10 comprises, as mentioned above, a pair of control pedals 22. Said control pedals 22 are each arranged on a front portion 24b of the base 24. Each control pedal 22, through the connection to a suitable electronic control unit, known per se, is configured to drive a respective driving wheel 16. In particular, each control pedal 22 is arranged to control the delivery of driving torque by an electric motor 20 and, therefore, to drive in rotation a respective associated driving wheel 16, as a function of a command given by the passenger P seated on the seat 14. The passenger P may control the control pedal 22 by pressing a foot thereon, in a known and analogous way to that which happens in known self-balanced electric scooters in which the inclination of a control pedal is associated with a rotation of a driving wheel.

With reference now also to FIGS. 6, 7 and 8, the seat 14 is arranged on the strut 26 so as to be able to accommodate a passenger P in a sitting position when the strut 26 is in the open configuration.

According to a preferable embodiment, the seat 14 may be reconfigured between a configuration of use, wherein it is arranged to accommodate the seated passenger P, and a configuration of reduced size, wherein the seat 14 is not arranged to accommodate the passenger P. In particular, the seat 14 may comprise a plurality of portions of the seat 14' (in the example of FIGS. 6, 7 and 8, in particular, two equal and symmetrically arranged portions of the seat 14'), mounted pivotably on the strut 26 of the frame. The portions of the seat 14' are pivotable between an open position, wherein they jointly define a seat surface for the passenger P, and a closed position, wherein they have reduced dimensions, for example along a transverse direction.

As mentioned above, FIGS. 6, 7 and 8 show the seat 14 according to the embodiment just described in, respectively, a first, a second and a third configuration. In particular, in the first configuration, the seat 14 is shown in the position of use, wherein the portions of the seat 14' are arranged so as to jointly define a seat surface for the passenger P. In FIG.

7, the portions of the seat 14' are shown in motion, according to the directions of rotation indicated by the arrows F4 and F5. Finally, in FIG. 8, the portions of the seat 14' are arranged in the reduced size position, i.e. closed in order to reduce the transverse size of the seat 14.

Preferably, the portions of the seat 14' each have an opening 40 arranged to reduce the weight of the transporter 10 and improve the seating comfort for the passenger P.

Figure 9:
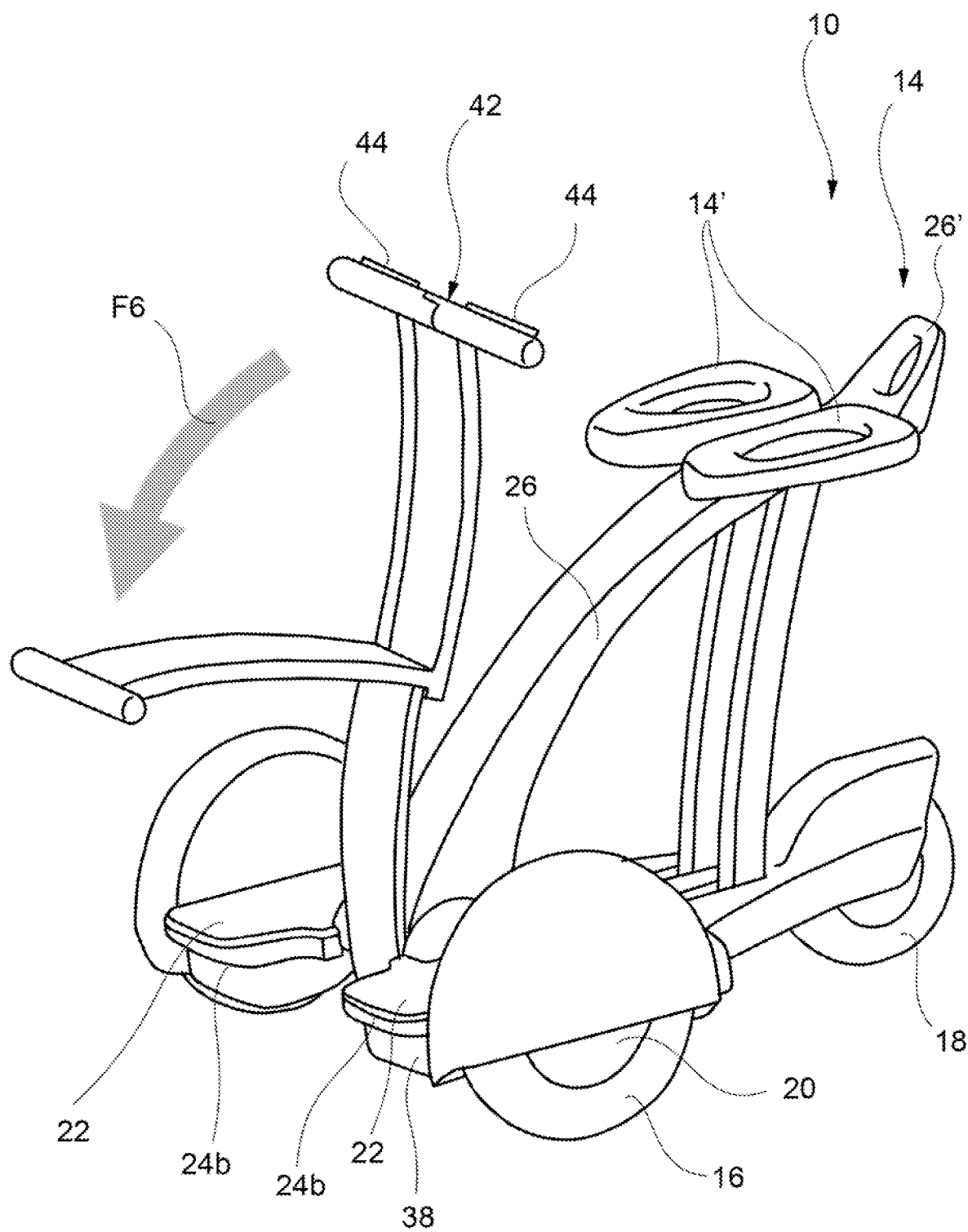
FIG. 9 is a perspective view of a transporter according to a further embodiment of the invention.

Advantageously, as shown in FIG. 9, the transporter 10 further comprises a handlebar 42 arranged to provide a support surface for the hands of the passenger P seated on the seat 14. The handlebar 42 is preferably foldable according to the direction indicated by the arrow F6, or retractable, for example in a telescopic way, so that it may be brought into a configuration of use only when needed, and may be brought into a position of minimum size when necessary. In particular, in FIG. 9, the foldable handlebar 42 is shown in two different positions, namely the position of use and a partially folded position wherein the handlebar 42 is in motion until it is completely folded back on itself.

Preferably, at least one control device 44 is provided on said handlebar 42. Such a control device 44 may comprise, for example, a joystick, a control bar, a control lever, a handlebar mechanism, an electronic input device, a button mechanism, etc. Said control device 44 may be joined to the pair of electric motors 20 for driving each driving wheel 16 in rotation, and/or to a respective control member for steering the non-driving wheel 18 and, therefore, facilitating the change of direction of the transporter 10. The control device 44 allows the speed and direction of the transporter 10 to be controlled, even in the event of damage to one or both of the control pedals 22.

As may be seen from the foregoing description, a personal transporter according to the present invention allows the disadvantages of the prior art to be overcome. In particular, by virtue of the configuration of the seat and the wheels, it may be easily used even by a passenger with impaired mobility, or in any case without particular athletic ability or training.

Furthermore, by virtue of the possibility of folding the strut and/or the seat, it is possible to store the transporter in a confined space, for example inside the trunk of a car, to be able to transport it easily. Furthermore, due to the arrangement of the two driving wheels, when the strut is in the folded configuration, as shown in FIGS. 4 and 5, it is possible to pull the transporter without having to lift it, similarly to a trolley case, with an obvious advantage for the passenger.

Naturally, without prejudice to the principle of the invention, the embodiments and the details of construction may be widely varied with respect to that which has been described and illustrated purely by way of non-limiting example, without thereby departing from the scope of the invention defined by the appended claims.

The invention claimed is:

1. A personal transporter for transporting a passenger, said personal transporter comprising:
   a seat configured to accommodate the passenger in a sitting position;
   a frame comprising:
      a base, configured to form a support surface for feet of the passenger, and
      a strut connected to said base and configured, in use, to support said seat in a lifted position relative to said base,
      wherein the strut is movable relative to the base between an open configuration, in which the seat is in a distal position relative to the base, and a folded configuration relative to the base, in which the seat is in a proximal position relative to the base,
      wherein the strut is hinged, at a first end, to the base, pivotably between the open configuration and the folded configuration;
   a pair of driving wheels and at least one non-driving wheel associated to said base, said pair of driving wheels and said at least one non-driving wheel being configured to define, in use, three unaligned points of support on a ground;
   a pair of electric motors, each electric motor being configured to supply a driving torque to a respective driving wheel;
   a pair of control pedals, each control pedal being associated with a respective electric motor to drive in rotation a respective driving wheel, depending on a command imparted on said control pedal by the passenger sitting on the seat; and
   a support rod configured, in use, to support the strut in the open configuration, said support rod being hinged to the strut at a second end of the strut, opposite to said first end of the strut, and being slidably mounted on the base;
   wherein the base comprises a guide, in which the support rod is slidably mounted, and
   wherein said base comprises a rear portion configured to support said at least one non-driving wheel and a pair of front portions, each front portion being hinged to the strut and rotatable integrally with a respective control pedal.

2. The personal transporter of claim 1, further comprising damping means arranged in said guide and configured to dampen a sliding movement of the support rod in the guide.

3. The personal transporter of claim 1, wherein said guide is arranged on said rear portion of the base.

4. The personal transporter of claim 1, wherein the rear portion of the base defines a support surface for accommodating a piece of luggage.

5. The personal transporter of claim 1, wherein said seat comprises a plurality of portions pivotably mounted on the strut of the frame, and wherein said portions of the seat are pivotable between an open position, in which said portions of the seat jointly define a seating surface for the passenger, and a closed position, in which the seat is in a configuration that takes up a minimal amount of space.

6. The personal transporter of claim 5, wherein each portion of the seat has an opening configured to reduce weight of the personal transporter.

7. The personal transporter of claim 1, wherein at least one front portion of the base is configured to accommodate a rechargeable battery to supply electric power to the pair of electric motors.

8. The personal transporter of claim 1, further comprising a handlebar connected to said frame and configured to provide a support surface for hands of the passenger.

9. The personal transporter of claim 8, wherein at least one control device is provided on said handlebar, said at least one control device being operatively associated with the pair of electric motors to drive in rotation each driving wheel.

10. The personal transporter of claim 8, wherein at least one control device is provided on said handlebar, said at least one control device being operatively associated with a respective control member for directing the non-driving wheel.

11. The personal transporter of claim 1, wherein the strut comprises, at its second end, a handle to allow the personal transporter to be pulled when the strut is in the folded configuration.

* * * * *